US010614072B2

(12) United States Patent
Enoki et al.

(10) Patent No.: US 10,614,072 B2
(45) Date of Patent: Apr. 7, 2020

(54) METHOD, PROGRAM, AND SYSTEM FOR PROCESSING SPACE-TIME DATABASE (71) Applicant: International Business Machines Corporation, Armonk, NY (US)

(72) Inventors: Miki Enoki, Kanagawa-ken (JP); Hiroshi Horii, Tokyo (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 15/385,391

(22) Filed: Dec. 20, 2016

(65) Prior Publication Data
US 2017/0103109 A1 Apr. 13, 2017

Related U.S. Application Data (63) Continuation of application No. 14/291,714, filed on May 30, 2014, now Pat. No. 9,529,844.

(30) Foreign Application Priority Data

Jun. 5, 2013 (JP) ................................. 2013-118759

(51) Int. Cl.
G06F 17/30 (2006.01)
G06F 16/2455 (2019.01)
(Continued)

(52) U.S. Cl.
CPC ...... G06F 16/24568 (2019.01); G06F 16/245 (2019.01); G06F 16/248 (2019.01); G06F 16/2477 (2019.01)

(58) Field of Classification Search
CPC ......... G06F 17/30516; G06F 17/30551; G06F 17/30; G06F 17/30424; G06F 16/24568;
(Continued)

(56) References Cited

U.S. PATENT DOCUMENTS 6,353,820 B1 * 3/2002 Edwards ........... G06F 17/30336
707/696
7,904,444 B1 3/2011 Koudas et al.
(Continued)

FOREIGN PATENT DOCUMENTS

JP 2006-338432 A 12/2006
JP 2007-328716 A 12/2007
(Continued)

OTHER PUBLICATIONS

Japanese Decision to Grant in Application No. 2013-118759, dated Sep. 13, 2016 with an English translation thereof.
(Continued)

Primary Examiner — Isaac M Woo
(74) Attorney, Agent, or Firm — Anthony Curro, Esq.; McGinn IP Law Group, PLLC (57) ABSTRACT A feature selection apparatus, including a computer readable storage medium storing a program, and a processor executing the program and configured to perform storing a spatio-temporal database in the computer readable storage medium, extracting data under a predetermined condition from the spatio-temporal database for sorting, receiving a query, and outputting the data according to the query of the spatio-temporal database.

20 Claims, 9 Drawing Sheets (51) Int. Cl.
  *G06F 16/245* (2019.01)
  *G06F 16/248* (2019.01)
  *G06F 16/2458* (2019.01)

(58) Field of Classification Search
  CPC ... G06F 16/245; G06F 16/2477; G06F 16/248
  USPC .................................................. 707/600–899
  See application file for complete search history.

(56) References Cited

U.S. PATENT DOCUMENTS

| | | | |
|---|---|---|---|
| 9,251,155 | B1 | 2/2016 | Galimberti |
| 2011/0060753 | A1* | 3/2011 | Shaked ............... G06F 16/2477 707/769 |
| 2012/0166417 | A1 | 6/2012 | Chandramouli |
| 2012/0330931 | A1* | 12/2012 | Nakano ............. G05B 23/0283 707/722 |
| 2013/0330055 | A1* | 12/2013 | Zimmermann .... H04N 21/2743 386/240 |

FOREIGN PATENT DOCUMENTS

| | | |
|---|---|---|
| JP | 2009-009304 A | 1/2009 |
| JP | 2009-134689 A | 6/2009 |
| JP | 2010-108152 A | 5/2010 |
| JP | 2010-134599 A | 6/2010 |
| JP | 2011-028658 A | 2/2011 |
| JP | 2011-193447 A | 9/2011 |
| WO | WO 2008/007677 A1 | 1/2008 |

OTHER PUBLICATIONS

Japanese Notification of Reasons for Refusal in Application No. 2013-118759, dated May 24, 2016 with an English translation thereof.

Mohamed F. Mokbel et al., "PLACE: A Query Processor for Handling Real-time Spatia-temporal Data Streams".

VLDB '04 Proceedings of the Thirtieth international conference on Very large data bases, 2004, pp. 1377-1380, vol. 30, Toronto, Canada.

T.Y. Cliff Leung et al., "Generalized Data Stream Indexing and Temporal Query Processing", Research Issues on Data Engineering. 1992: Transaction and Query Processing, Second International Workshop on Feb.-Mar. 2, 1992, 2002, pp. 124-131, IEEE.

U.S. Notice of Allowance dated Aug. 24, 2016 issued in U.S. Appl. No. 14/291,714.

* cited by examiner

METHOD, PROGRAM, AND SYSTEM FOR PROCESSING SPACE-TIME DATABASE

CROSS-REFERENCE TO RELATED APPLICATION

The present application is a Continuation application of U.S. patent application Ser. No. 14/291,714, filed on May 30, 2014, which is based on Japanese Patent Application No. 2013-118759 filed on Jun. 5, 2013, the entire contents of which are hereby incorporated by reference.

BACKGROUND OF THE INVENTION

1. Field of the Invention

The present invention relates to a technique for querying a spatio-temporal database by stream processing.

2. Description of Related Art

Querying a spatio-temporal database by stream processing has recently been increasing as stream processing has become widespread. An example thereof is a ratings compilation system shown in FIG. 1.

Figure 1:
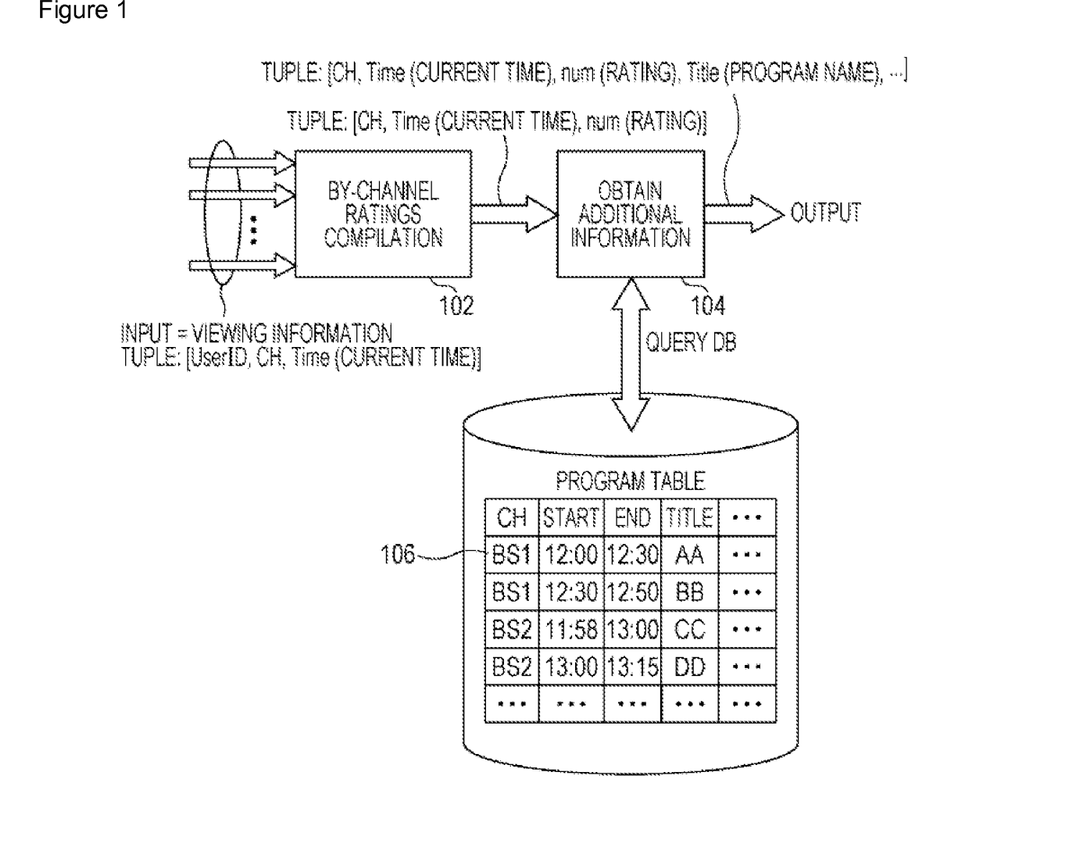
FIG. 1 is a diagram showing, in outline, a conventional ratings compilation system.

In FIG. 1, viewing information input from set top boxes (STBs) disposed in TVs in a plurality of homes from moment to moment includes a tuple {user ID (UserID), CH (channel), Time (current time)}.

An input viewing information stream is compiled into a tuple {CH, Time (current time), num (rating)} by a stream processing operator referred to as a by-channel ratings compilation 102. A stream processing operator referred to as an additional information acquisition 104 receives the tuple {CH, Time (current time), num (rating)}, queries a program database 106, shown as a program table, stored in a hard disk drive of the computer system using channel (CH) in the tuple as a key, joins the result of the query and the tuple {CH, Time (current time), num (rating)} together to generate a tuple {CH, Time (current time), num (rating), Title (program name), . . . }, and outputs the tuple. The program database 106 is also referred to as a spatio-temporal database because it includes a time field.

However, querying a spatio-temporal database from a stream processing operator in such a system needs a complicated description, such as schema mapping and SQL. An example of the description of SQL is as follows:

```
SELECT Title, ... FROM Program
WHERE CH = ? and Start <= CT and End > CT
//, where CT is the time stamp of a current time.
```

Furthermore, if real-time stream processing is required, further optimization is needed. Specifically, a database querying process that involves accessing a hard disk drive causes a bottleneck in access. However, loading data in a database into a main memory has difficulty because it consumes too much memory. Furthermore, using a cache of the database is also difficult because query parameters include a current time.

For such processes, the following conventional technique is known. First, Japanese Unexamined Patent Application Publication No. 2006-338432 discloses a stream-data processing system that provides a mechanism for replicating part or all of stream data and archiving the replication into a non-volatile storage means medium to allow the real-time data and the archive data to be used seamlessly and a mechanism for connecting a plurality of stream-data processing systems to enhance the performance of a query process.

Japanese Unexamined Patent Application Publication No. 2007-328716 discloses a method for reducing the number of accesses to a database to enhance the performance by providing a stream predict cache, which is a hierarchical cache of relation data that can be predicted as a target to be compared with stream data.

Japanese Unexamined Patent Application Publication No. 2011-28658 discloses a database unit that tracks the latest cache entry in a cache with a cache tracker of a cache device, records the cache entry on a cache management table, and if a base-table updating process occurs, identifies data that is influenced by the base-table updating process, on the base table present in the cache, transmits a message to abandon the cache entry of the identified data to the cache device, in which the cache device discards the cache entry in the cache designated by the discard message.

Mohamed F. Mokbel, Xiaopeng Xiong, Walid G. Aref, Susanne E. Hambrusch, Sunil Prabhakar, and Moustafa A. Hammad, "PLACE: a query processor for handling real-time spatio-temporal data streams", VLDB '04 Proceedings of the Thirtieth international conference on Very large data bases—Volume 30 Pages 1377-1380 describes a technique for implementing spatio-temporal data for searching for an object included in a certain area.

T. Y. Cliff Leung, and Richard R. Muntz, "Generalized data stream indexing and temporal query processing", Research Issues on Data Engineering, 1992: Transaction and Query Processing, Second International Workshop on 2-3 Feb. 1992, Pages 124-131 describes a proposal for building an index for implementing various kinds of joining of spatio-temporal data.

However, these conventional techniques do not suggest solving the problem of performance in querying a spatio-temporal database from a stream processing operator.

BRIEF SUMMARY OF THE INVENTION

One aspect of the present invention provides a system for querying a database including: a storage means; a processor communicatively coupled to the storage means; and a feature selection module communicatively coupled to the storage means and the processor, wherein the feature selection module is configured to perform the steps of a method including: storing a database in the storage means, the database including a time field; extracting data in a predetermined period from a current time from the database; sorting the data by the time field; buffering the sorted data in a main memory; receiving a query including time; and outputting the data buffered on the basis of the time field as a stream.

Another aspect of the present invention provides a computer implemented method for querying a database, the method including the steps of: extracting data in a predetermined period from a current time from a database including a time field stored in a storage means; sorting the data by the time field; buffering the data in a main memory; receiving a stream including time; outputting the data that is buffered on the basis of the time field as a stream; of the buffered data, joining data matching a predetermined matching condition; and outputting the matched data.

Yet another aspect of the present invention provides a computer program product for querying a database, the program causing the computer to execute the steps of: extracting data in a predetermined period from a current time from a database stored in a storage means, the database including a time field; sorting the data by the time field; buffering the sorted data in a main memory; receiving a stream including time; outputting the data that is buffered on the basis of the time field as a stream; of the buffered data, joining data matching a predetermined matching condition; and outputting the matched data.

DETAILED DESCRIPTION OF THE PREFERRED EMBODIMENTS

Accordingly, an object of the present invention is to provide a technique for implementing stream processing capable of using data in a spatio-temporal database.

The present invention solves the above problem by generating a data stream based on time data in the records of a spatio-temporal database and implementing a data stream operation considering space and time.

Here, terms used in the description of the present invention are defined as follows: a spatio-temporal data stream includes the term of validity (start time and end time) in a tuple in a stream. Such a tuple is also referred to as a spatio-temporal tuple. A spatio-temporal data stream process is a stream process that selectively performs processing depending on the term of validity of the tuple. Temporal joining is joining tuples in which terms of validity overlap.

A process according to an embodiment of the present invention includes the process of generating a spatio-temporal data stream from a spatio-temporal database and a spatio-temporal data stream process that performs temporal joining.

A system according to an aspect of the present invention executes the following steps in the process of generating a spatio-temporal data stream from a spatio-temporal database: Sorting records in the spatio-temporal database in order of validity start time in the records and regularly buffering records in a fixed time from a current time into a main memory or the like. And outputting a record in the buffer as a spatio-temporal tuple at the point where the validity start time of the record is reached.

Preferably, in the process of generating the spatio-temporal data stream from the spatio-temporal database, the system according to the aspect of the present invention executes the process of transmitting a notification about the expiration of the validity of a record in the buffer to a spatio-temporal stream receiving side at the point where the validity end time of the record is reached.

The system according to the aspect of the present invention further executes the following steps in the spatio-temporal data stream process: Selecting a target spatio-temporal tuple using the term of validity of an input spatio-temporal tuple and performing a stream process. As a result, the output is also a spatio-temporal tuple. And deleting a spatio-temporal tuple buffered in an operator at the point where the term of validity expires.

Preferably, in the spatio-temporal data stream process, the system according to an embodiment of the present invention further executes the step of flashing the spatio-temporal tuple buffered in the operator at the time when receiving the validity end time.

According to an embodiment of the present invention, the process of joining records in a spatio-temporal database with input stream data can be performed at high speed by sorting the records in order of validity start time, regularly buffering records in a fixed time from a current time into a main memory or the like, and generating stream data on the basis thereof.

The present invention generates a data stream based on time data in the records of a spatio-temporal database and implements a data stream operation considering space and time. In the process of generating a spatio-temporal data stream from a spatio-temporal database, records in the spatio-temporal database are sorted in order of validity start time in the records, records in a fixed time from a current time are regularly buffered into a main memory or the like, and the records in the buffer are output as a spatio-temporal tuple at the point where the validity start time of the records is reached. In the spatio-temporal data stream generating process, the process of selecting a target spatio-temporal tuple and a stream process are performed using the term of validity of an input spatio-temporal tuple. The process of deleting a spatio-temporal tuple buffered in an operator is executed at the point where the time of validity expires.

Embodiments of the present invention will be described below with reference to the drawings. It should be understood that these embodiments are merely for explaining preferred forms of the present invention and are not intended to limit the scope of the present invention. The same reference sign denote the same object in all of the drawings unless otherwise noted.

Figure 2:
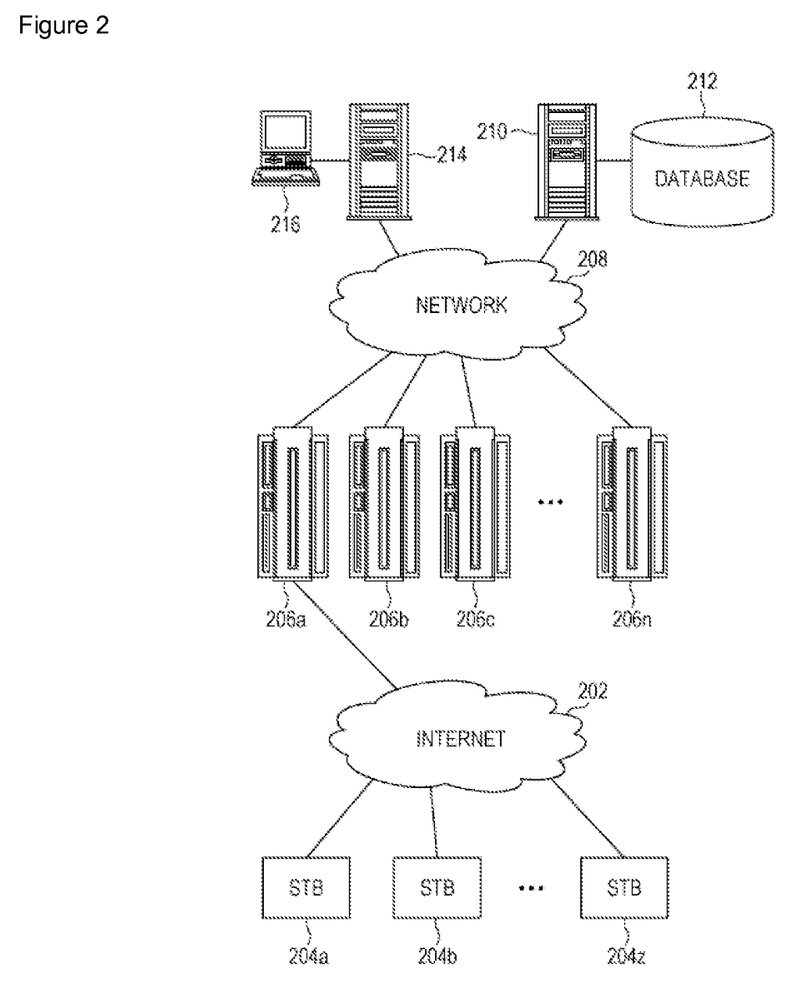
FIG. 2 is a diagram showing a hardware configuration for implementing an embodiment of the present invention.

FIG. 2 is a diagram showing, in outline, an example of the configuration of a system for implementing the present invention. The present invention will be described using a viewing-information compilation system as an example, although not limited thereto.

In FIG. 2, set top boxes (STBs) 204a to 204z disposed in TVs at individual homes are connected to the Internet 202 and transmit information about the users ID, channels (CH), and times of the STBs 204a to 204z via the Internet 202.

The tuples, each including the information about the user ID, channel (CH), and time, are transmitted from the STBs 204a to 204z to the Internet 202 are received by a server 206a.

The server 206a is connected to a network 208, which is LAN, WAN, FHHT, or another connecting configuration. The network 208 is also connected to servers 206b to 206n, 210, and 214. Examples of the servers 206b to 206n, 210, and 214 include IBM® System X, System i, and System p available from International Business Machines Corporation, although not limited thereto. Examples of operating systems usable in these servers include AIX™, UNIX™, Linux™, Windows™ 2008 servers. These embodiments use Linux™ servers.

The servers 206a to 206n install IBM® InfoSphere Streams, and thus the servers 206a to 206n serve as stream servers. The number of stream servers can be either one or more, which depends on the throughput of stream data.

The server 210 is a database server, to which a database 212 is connected. The database 212 can either be stored in a local disk drive of the server 210 or be connected to the database server 210 via a network, such as a storage means area network (SAN) or a network attached storage means (NAS). The server 210 installs a database management program, such as DB2. The database 212 includes a program database. The program database includes channel (CH), start time (START), end time (END), and title (TITLE) fields.

The server 214 is an application server, which installs a Linux™ operating system and an IBM® WebSphere™ application server (WAS) in Java®. The server 214 connects to a client computer 216. The administrator or operator operates the client computer 216 to appropriately change the configurations of the servers 206a to 206n, which are stream servers, and the server 210, which is a database server, through a WAS management tool or the like.

Figure 3:
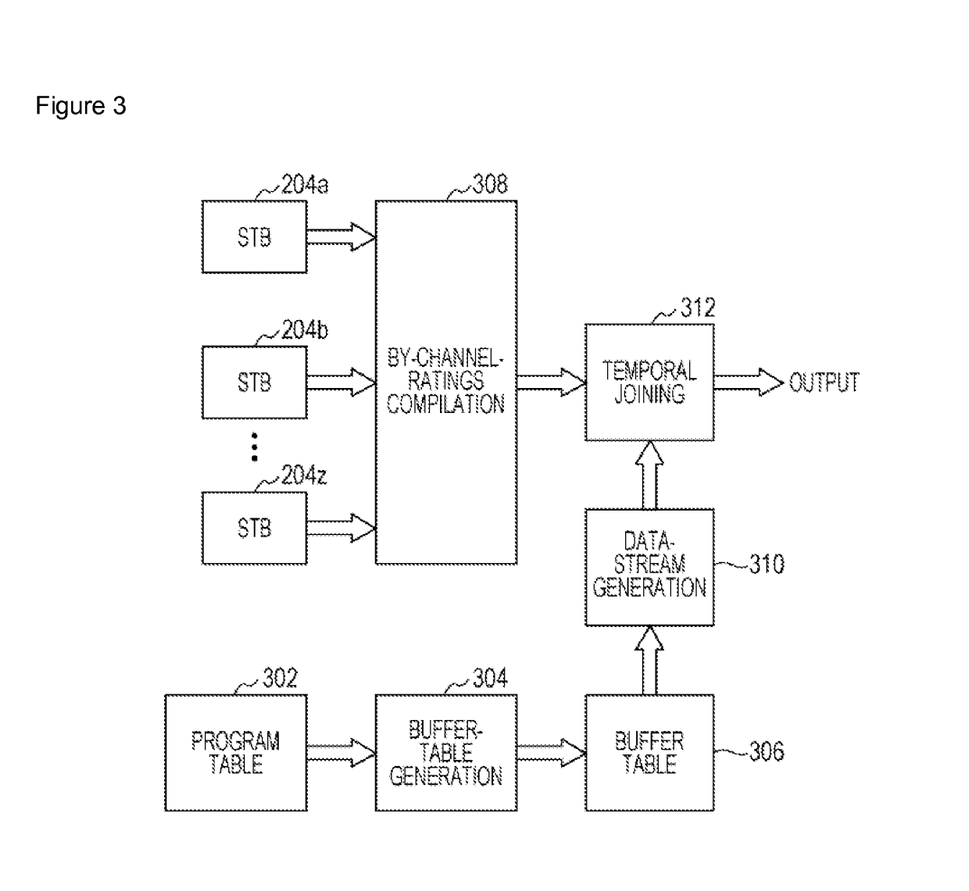
FIG. 3 is a functional block diagram of an embodiment of the present invention.

Referring next to FIG. 3, the functional configuration of the process of an embodiment of the present invention will be described. In FIG. 3, a program table 302 is included in the database 212 in FIG. 2 and includes channel (CH), start time (START), end time (END), title (TITLE) fields.

A buffer-table generation routine 304 is preferably stored in a hard disk drive (not shown) of the server 210 and has the function of extracting records from the program table 302 under a predetermined condition to generate a buffer table 306 by operation. The buffer table 306 preferably sorts data in a fixed time (for example, 30 minutes) after a current time in order of START and loads the data into a main storage means (not shown) of one of the stream servers 206a to 206n. The buffer-table generation routine 304 can be created in an appropriate existing computer programming language, such as Java®, C, C++, or C #. The process of the buffer-table generation routine 304 will be described later with reference to a flowchart in FIG. 4.

A by-channel ratings compilation operator 308 is created in, for example, a streams processing language (SPL) used in IBM® InfoSphere Streams, so as to run in a stream server. The by-channel ratings compilation operator 308 compiles tuples [UserID, CH (channel), Time (current time)] received from the STBs 204a to 204z at intervals of a fixed time and outputs a tuple [CH (channel), Time (current time), num (rating)].

A data-stream generation routine 310 outputs a spatio-temporal tuple [CH, START, END, TITLE, . . . ] at the point where the current time reaches START. The data-stream generation routine 310 can also be created in an appropriate stream language, such as the SPL. An example of a code therefor is as follows:

```
stream<Temporal_tuple> T_stream = GenTemporal( ) {
param
table: Program
timeS: Program.Start
timeE: Program.End
}
```

The process of the data-stream generation routine 310 will be described later with reference to a flowchart in FIG. 6.

Preferably, a temporal joining operator 312 is also written in the SPL used in IBM InfoSphere Streams so as to run in a stream server. The temporal joining operator 312 receives a stream output from the by-channel ratings compilation operator 308 and a stream output from the data-stream generation routine 310, joins the streams in terms of time, and outputs a stream [CH, Time (current time), num (rating), Title (program name), . . . ].

An example of a code therefor is as follows:

```
stream<Combined_tuple> Join =
TemporalJoin(Input_stream: T_stream) {
param
match: Input_stream.CH = T_stream.CH
}
```

The process of the temporal joining operator 312 will be described later with reference to flowcharts in FIGS. 7 and 8.

Referring next to the flowchart in FIG. 4, the process of the buffer-table generation routine 304 will be described.

Figure 4:
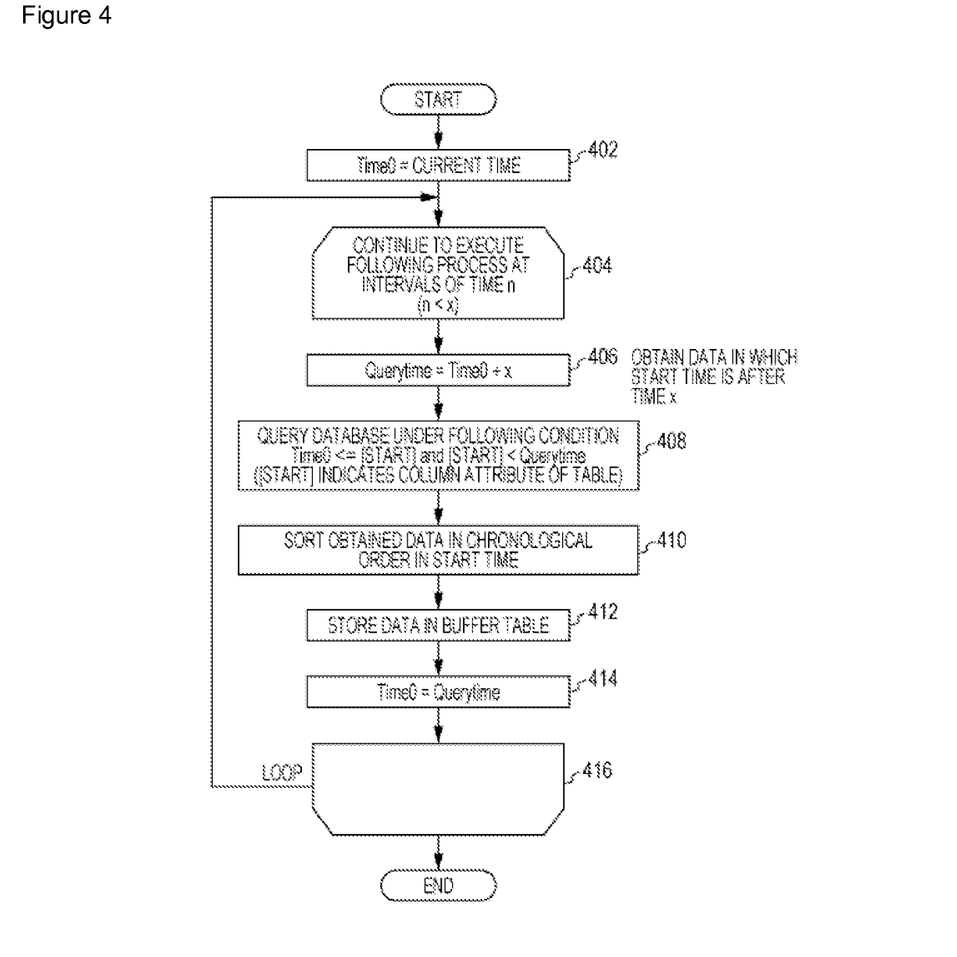
FIG. 4 is a flowchart of the process of a buffer-table generation routine.

In FIG. 4, the buffer-table generation routine 304 sets Time0=current in step 402, and steps 404 to 416 are a loop executed at intervals of time n, where n is a value smaller than x, described below.

In step 406, the buffer-table generation routine 304 sets Querytime=Time0+x. This means that data in which start time is after time x is to be obtained.

The buffer-table generation routine 304 queries a database, that is, the program table 302, in step 408, under the condition of Time0<=[START] and [START]<Querytime. Here, START indicates a start time field in the program table 302.

The buffer-table generation routine 304 sorts the obtained data in chronological order in START time in step 410 and stores the sorted data in the buffer table 306 in step 412. In step 414, the buffer-table generation routine 304 sets Time0=Querytime and returns to step 404, in which it enters the next loop after waiting for time n.

Figure 5:
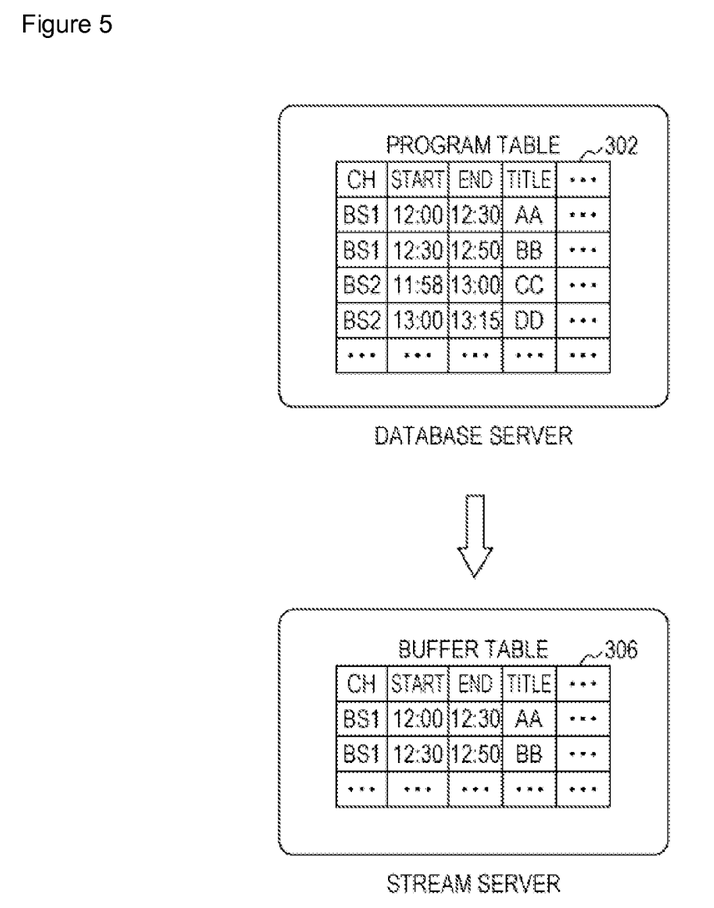
FIG. 5 is a diagram showing a state in which data is extracted from a program table to a buffer table.

FIG. 5 shows a state in which data is stored from the program table 302 into the buffer table 306 by the buffer-table generation routine 304. FIG. 5 shows that data in which start time is after 12:00 is stored in the buffer table 306.

Referring next to the flowchart in FIG. 6, the process of the data-stream generation routine 310 will be described.

Figure 6:
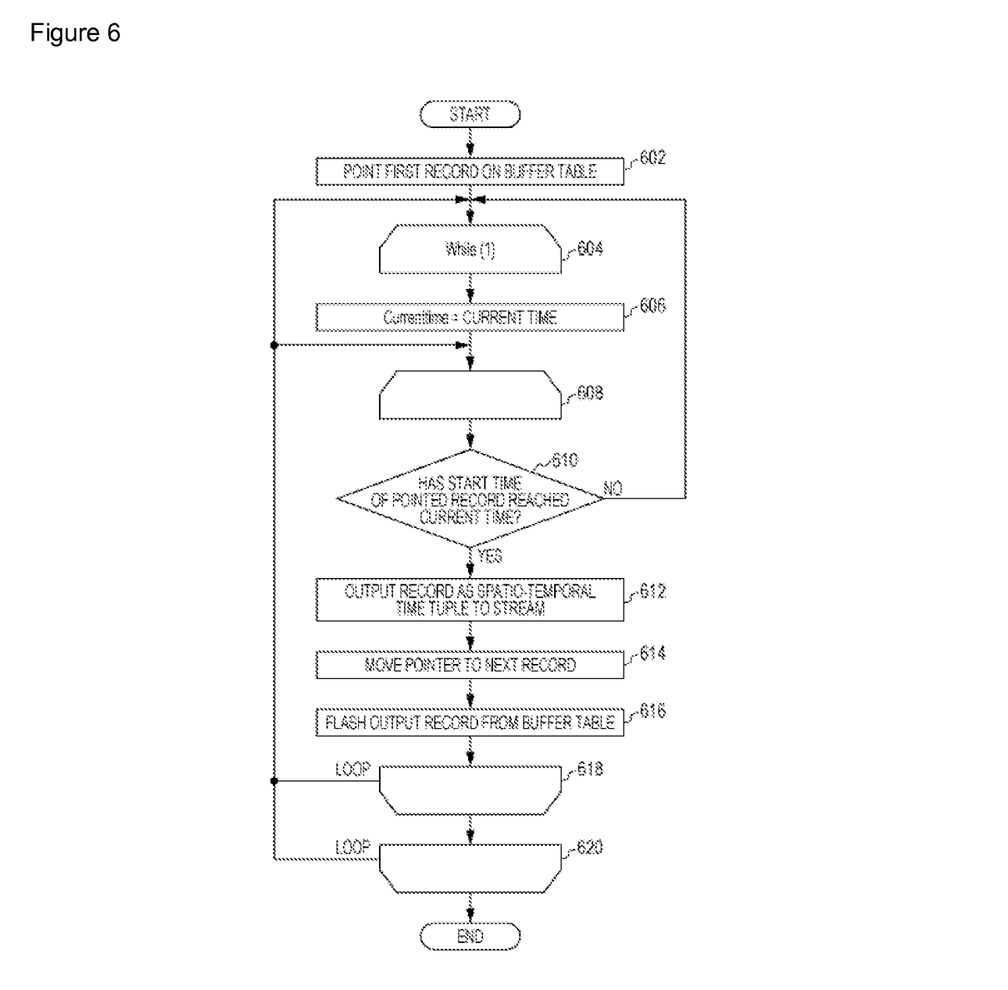
FIG. 6 is a flowchart of the process of a data-stream generation routine.

In step 602 of FIG. 6, the data-stream generation routine 310 points the first record on the buffer table 306.

The process from steps 604 to 620 is an external loop. In step 606, the data-stream generation routine 310 sets the current time to Currenttime.

The process from steps 608 to 618 is an inner loop. In step 610, the data-stream generation routine 310 determines whether the start time of the pointed record has reached Currenttime, and if not, the process returns to step 604.

If the start time of the pointed record has reached Currenttime, the data-stream generation routine 310 outputs the record to the stream as a spatio-temporal tuple in step 612. In step 614 the pointer moves to the next record, then flashes the output record from the buffer table 306 in step 616, and returns to step 608, which is the start point of the inner loop.

Figure 7:
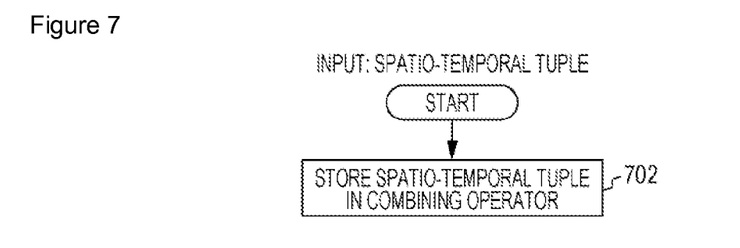
FIG. 7 is a flowchart of a temporal joining process.
Figure 8:
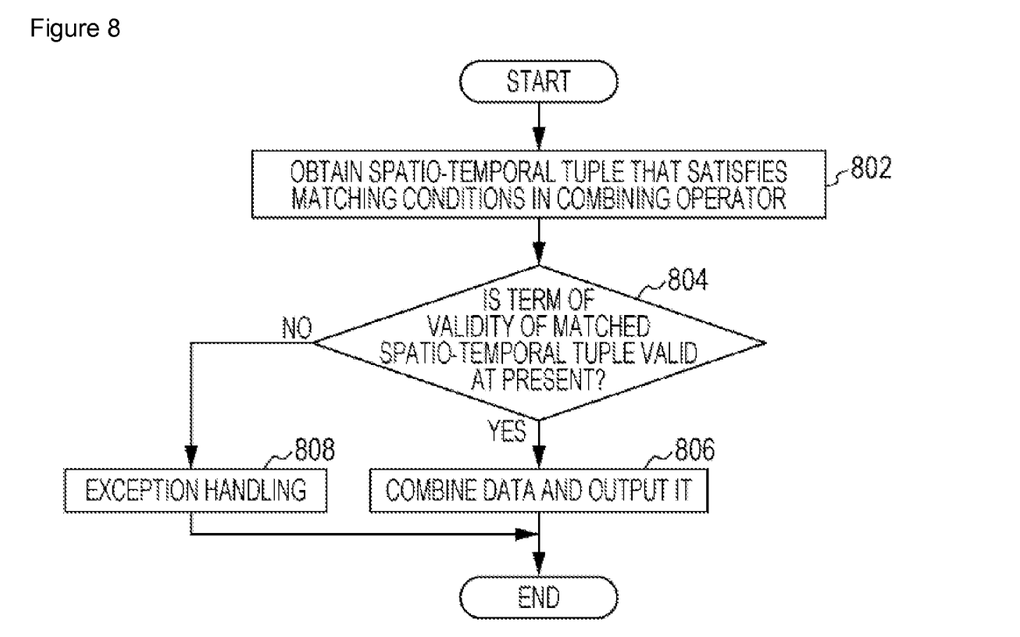
FIG. 8 is a flowchart of a temporal joining process.

Referring next to the flowcharts in FIGS. 7 and 8, the process is described of the temporal joining operator 312.

The flowchart in FIG. 7 is the process of input from the data-stream generation routine 310 to the temporal joining operator 312. Specifically, the output in step 612 of FIG. 6 is input as a spatio-temporal tuple and is stored in a combining operator in step 702.

The flowchart in FIG. 8 is the process of input from the by-channel ratings compilation operator 308 to the temporal joining operator 312. In step 802 of FIG. 8, the temporal joining operator 312 obtains a spatio-temporal tuple that satisfies a matching condition in the combining operator. Here, the matching condition is a condition written following match: in the following code example:

```
stream<Combined_tuple> Join =
TemporalJoin(Input_stream: T_stream) {
param
match: Input_stream.CH = T_stream.CH
}
```

In step 804, the temporal joining operator 312 determines whether the term of validity of the matched spatio-temporal tuple is valid at present, and if valid, combines the data in step 806.

If the term of validity of the matched spatio-temporal tuple is not valid at present, the temporal joining operator 312 performs exception handling in step 808. Examples of this exception handling include discarding an input stream without executing the combining process, repeating the process of the flowchart in FIG. 8 from the beginning after waiting for a designated time, and if the data isn't combined after iterations, outputting an error log.

Figure 9:
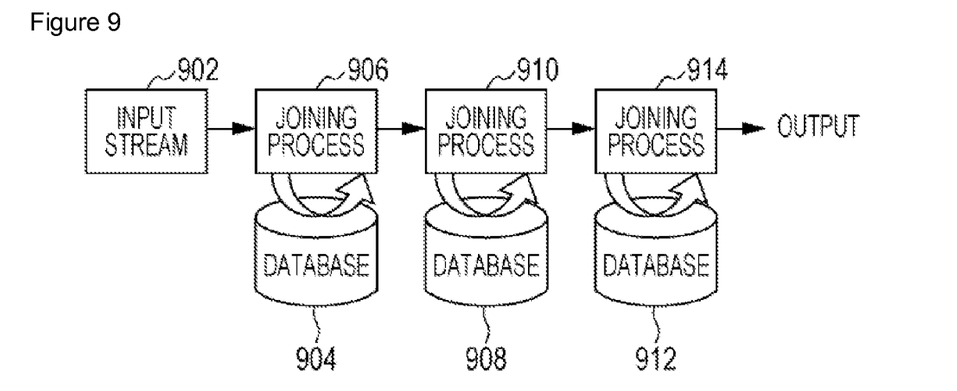
FIG. 9 is a diagram of an example of related art in which a joining process is performed on a plurality of databases.
Figure 10:
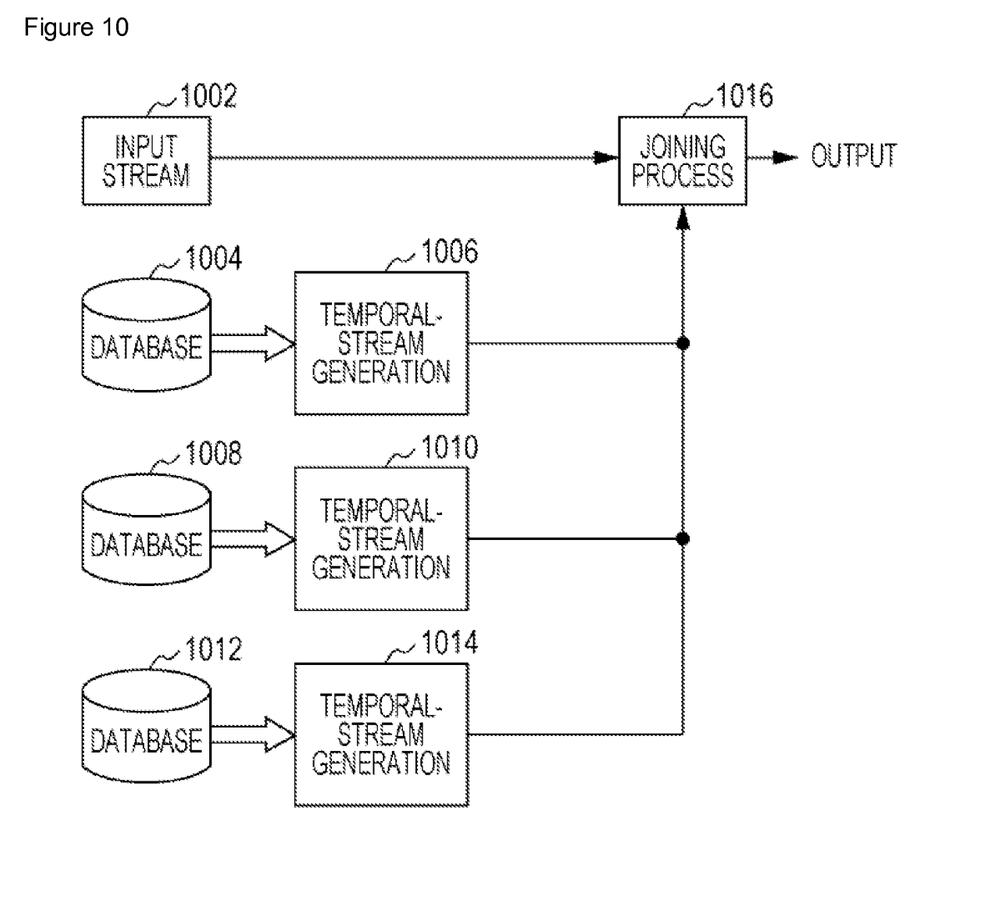
FIG. 10 is a diagram of an example of a configuration of an embodiment of the present invention in which a joining process is performed on a plurality of databases.

FIGS. 9 and 10 are diagrams for explaining the advantages of the present invention in more detail. Specifically, in a conventional technique schematically shown in FIG. 9 in which there are three databases 904, 908, and 912 on which the process is performed of joining with an input stream 902. An output is finally obtained by inputting the stream 902, thereafter performing a process 906 for joining the stream 902 with the database 904, a process 910 for joining it with the database 908, and a process 914 for joining it with the database 912 in sequence. Such a serial joining process obviously takes much time.

On the other hand, in the process according to an embodiment of the present invention, schematically shown in FIG. 10, the process of generating a buffer table from a database 1004, in addition to an input stream 1002, to perform a temporal-stream generation process 1006, the process of generating a buffer table from a database 1008 to perform a temporal-stream generation process 1010, and the process of generating a buffer table from a database 1012 to perform a temporal-stream generation process 1014 can be executed in parallel. They are joined together in a joining process 1016, thereby allowing an output to be obtained at high speed.

Figure 11:
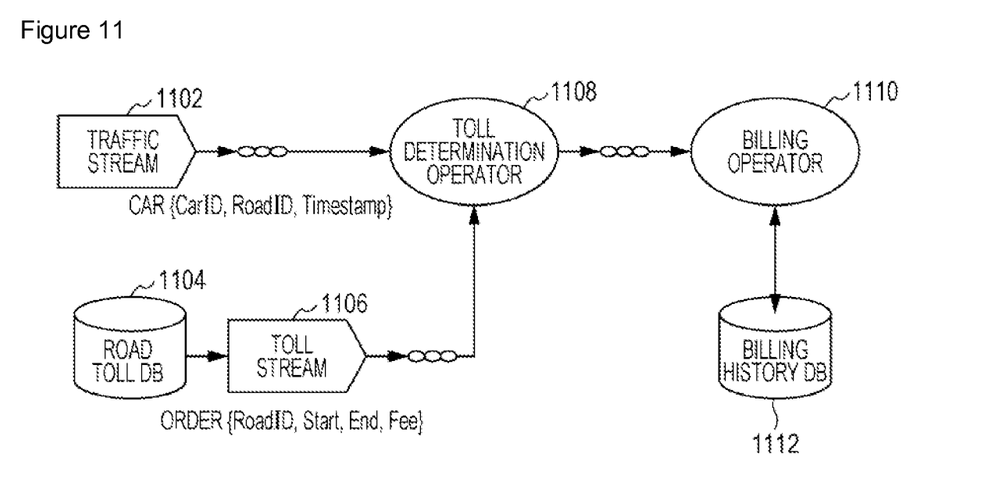
FIG. 11 is a diagram of an example of a road congestion pricing system.

FIG. 11 is a diagram of an embodiment in which the present invention is applied to a road congestion pricing system.

In FIG. 11, a traffic stream 1102 is a stream of information on vehicles passing through a toll road and includes a vehicle ID (CarID), a road ID (RoadID), and time (Timestamp). A road toll database 1104 includes a section ID (RoadID) of a section passed through, a start time (Start) and an end time (End) of the block time of the section, and the toll (Fee) for the section.

According to the embodiment of the present invention, a buffer table is created from the road toll database 1104, and a spatio-temporal toll stream is generated. The toll stream includes data on a validity start time. The road toll is determined by a simulation or the like which depends on the RoadID of a section passed through and the congestion level of the section during immediately preceding x minutes, and a time block to which the toll is to be applied is determined.

A toll determination operator 1108 inquiries a road toll based on the arrival time of the car and the ID of the toll road by using the traffic stream 1102 and the toll stream from the road toll database 1104. A billing operator 1110 charges each car with the road toll obtained by the toll determination operator 1108. The history thereof is stored in a billing history database 1112 as the need arises.

Figure 12:
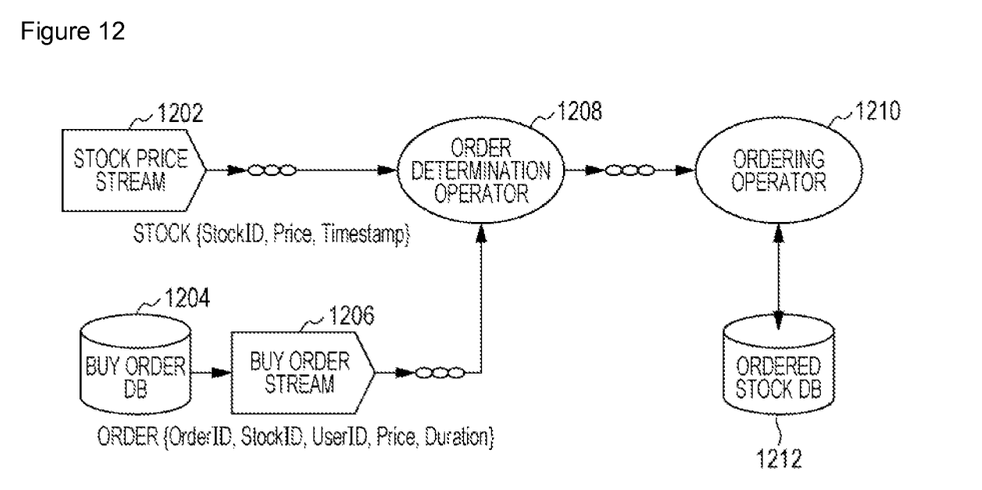
FIG. 12 is a diagram showing an example of a stock ordering process under temporal restriction.

FIG. 12 shows another embodiment of the present invention in which the system is applied to a stock ordering process under temporal restriction.

In FIG. 12, a stock price stream 1202 includes a tuple of a stock ID (StockID), a stock price (Price), and time (Timestamp). A buy-order database 1204 has order ID (OrderID), stock ID (StockID), user ID (UserID), stock price (Price), and duration (Duration) fields.

A buy order stream 1206 is a stream of the data of the buy order database 1204 using a buffer table.

An order determination operator 1208 performs sequential matching of the stock price stream 1202 with the buy order stream 1206 in terms of a stock price (Stock.Price<=Order.Price) and outputs a matched Order ID.

An ordering operator 1210 orders a stock with the order ID output from the order determination operator 1208 and records the result on an ordered-stock database 1212.

Although the embodiments of the ratings compilation process, the road congestion pricing process, and the stock ordering process under temporal restriction has been described, the present invention is not limited thereto and can be applied to any examples in which a spatio-temporal database stored in a hard disk drive or the like and stream data are joined.

The present invention can be implemented in any computer systems or platforms other than those in Java® used in the above embodiments.

What is claimed is:

1. A feature selection apparatus, comprising:
a non-transitory computer readable storage medium storing computer instructions; and
a processor executing the computer instructions and configured to perform:
storing a spatio-temporal database in the computer readable storage medium;
extracting data under a predetermined condition from the spatio-temporal database for sorting;
receiving a query; and
outputting the data for streaming considering space and time according to the query of the spatio-temporal database.

2. The feature selection apparatus according to claim 1, further comprising:
sorting the extracted data;
buffering the sorted data; and
of the buffered data, joining data matching a predetermined matching condition and outputting the matched data,
wherein the data according to the query of the spatio-temporal database is outputted to a display, and
wherein the data outputted is configured for stream processing,
wherein the outputting includes outputting a record in the data buffered as a spatio-temporal tuple at the point where the validity start time of the record is reached.

3. The feature selection apparatus according to claim 2, wherein the query including time is a stream of a tuple including time.

4. The feature selection apparatus according to claim 3, further comprising joining a stream of the buffered data and the stream of the tuple including time, in terms of time, and outputting a joined stream.

5. The feature selection apparatus according to claim 1, wherein a buffer in a main memory executes the buffering at predetermined intervals,
   wherein the outputted data comprises a spatio-temporal tuple,
   wherein the querying the spatio-temporal database is by stream processing, and
   wherein the sorting includes sorting records in the spatio-temporal database in order of validity start time in the records and regularly buffering records in a fixed time from a current time into the main memory.

6. A system for querying a database by a process of a computer, the system comprising:
   the feature selection apparatus according to claim 1; and
   a server communicating with the feature selection apparatus and connected in a network.

7. The system according to claim 6, wherein the spatio-temporal database outputs the spatio-temporal data stream considering space and time.

8. The system according to claim 6, wherein the data buffered is output as a spatio-temporal tuple at a point where a validity start time of records of the spatio-temporal database is reached.

9. The system according to claim 8, further comprising of selecting a target spatio-temporal tuple and a stream process using a term of validity of an input spatio-temporal tuple,
   wherein the sorting includes sorting records in the spatio-temporal database in order of validity start time in the records and regularly buffering records in a fixed time from a current time into the main memory,
   wherein the outputting includes outputting a record in the data buffered as a spatio-temporal tuple at the point where the validity start time of the record is reached, and
   wherein the generating further includes transmitting a notification about an expiration of the validity of the record in the data buffered to a spatio-temporal stream receiving side at a point where the validity end time of the record is reached.

10. The feature selection apparatus according to claim 1, wherein in a process of generating the spatio-temporal data stream from the spatio-temporal database, records in the spatio-temporal database are sorted in order of validity start time in the records, records in a fixed time from a current time are regularly buffered into a main memory, and the records in a buffer are output as a spatio-temporal tuple at a point where the validity start time of the records is reached.

11. The feature selection apparatus according to claim 1, wherein the outputting includes outputting a record in a data buffered as a spatio-temporal tuple at a point where a validity start time of the record is reached.

12. A computer implemented method for querying a database stored in a memory, the method comprising:
   extracting data in a predetermined period from a current time from a spatio-temporal database including a time field stored in a non-transitory computer readable storage medium;
   sorting the data;
   buffering the data; and
   outputting the data by streaming that is buffered as a spatio-temporal data stream considering space and time.

13. The method according to claim 12, wherein the buffering of the data in a main memory is executed at predetermined intervals,
   further comprising:
   deleting the output data from buffer; and
   selecting a target spatio-temporal tuple and a stream process using a term of validity of an input spatio-temporal tuple.

14. The method according to claim 12, wherein the spatio-temporal database outputs the spatio-temporal data stream considering space and time.

15. The method according to claim 12, wherein the data buffered is output as a spatio-temporal tuple at a point where a validity start time of records of the spatio-temporal database is reached.

16. The method according to claim 12, further comprising of selecting a target spatio-temporal tuple and a stream process using a term of validity of an input spatio-temporal tuple,
   wherein the sorting includes sorting records in the spatio-temporal database in order of validity start time in the records and regularly buffering records in a fixed time from a current time into the main memory, and
   wherein the outputting includes outputting a record in the data buffered as a spatio-temporal tuple at the point where the validity start time of the record is reached.

17. A computer program product embodying computer readable instructions which, when implemented, causes a computer machine to carry out a method for querying a database, the method comprising:
   extracting data in a predetermined period from a current time from a spatio-temporal database stored in a non-transitory computer readable storage medium, the spatio-temporal database including a time field;
   sorting the data;
   buffering the sorted data; and
   outputting the data by streaming that is buffered as a spatio-temporal data stream considering space and time.

18. The computer program product according to claim 17, further comprising:
   deleting the output data from the buffer,
   wherein the buffering of the data in a main memory is carried out at predetermined intervals, and
   wherein the spatio-temporal database outputs the spatio-temporal data stream considering space and time.

19. The computer program product according to claim 17, wherein the data buffered is output as a spatio-temporal tuple at a point where a validity start time of records of the spatio-temporal database is reached,
   wherein the spatio-temporal database includes space and time information in a same database.

20. The computer program product according to claim 19, further comprising of selecting a target spatio-temporal tuple and a stream process using a term of validity of an input spatio-temporal tuple,
   wherein the sorting includes sorting records in the spatio-temporal database in order of validity start time in the records and regularly buffering records in a fixed time from a current time into the main memory, and
   wherein the outputting includes outputting a record in the data buffered as a spatio-temporal tuple at the point where the validity start time of the record is reached.

* * * * *